United States Patent [19]

Beauchamp

[11] 4,228,228
[45] Oct. 14, 1980

[54] ELECTRODE STRUCTURE FOR ENERGY CELLS

[75] Inventor: Richard L. Beauchamp, Whitefish Bay, Wis.

[73] Assignee: Bell Telephone Laboratories, Incorporated, Murray Hill, N.J.

[21] Appl. No.: 81,939

[22] Filed: Oct. 4, 1979

[51] Int. Cl.³ .............................................. H01M 6/14
[52] U.S. Cl. .................................. 429/194; 429/217; 429/218
[58] Field of Search ................ 420/217, 194, 212, 218

[56] References Cited

U.S. PATENT DOCUMENTS

| | | | |
|---|---|---|---|
| 3,847,881 | 11/1974 | Mueller et al. | 260/30.77 |
| 4,118,334 | 10/1978 | Goebel | 252/182.1 |
| 4,130,696 | 12/1978 | Gunther | 429/217 X |
| 4,146,685 | 3/1979 | Pucholski | 429/217 X |

OTHER PUBLICATIONS

Nucleonics, Manno, P. J. 1964, vol. 22, pp. 64, 72.
Journal Polymer Science, Sibilia, John P., 1972, Structure of Ethylene-Chloro-Trifluoroethylene Copolymers, Part A-2, vol. 10, p. 549.

*Primary Examiner*—Charles F. LeFevour
*Attorney, Agent, or Firm*—Walter G. Nilsen

[57] ABSTRACT

Batteries or fuel cells having at least two electrodes and an electrolyte are described in which at least one of the electrodes employs an ethylene-perhaloethylene copolymer as binder material. The copolymer binder aids in maintaining adequate electrode structural integrity.

10 Claims, 1 Drawing Figure

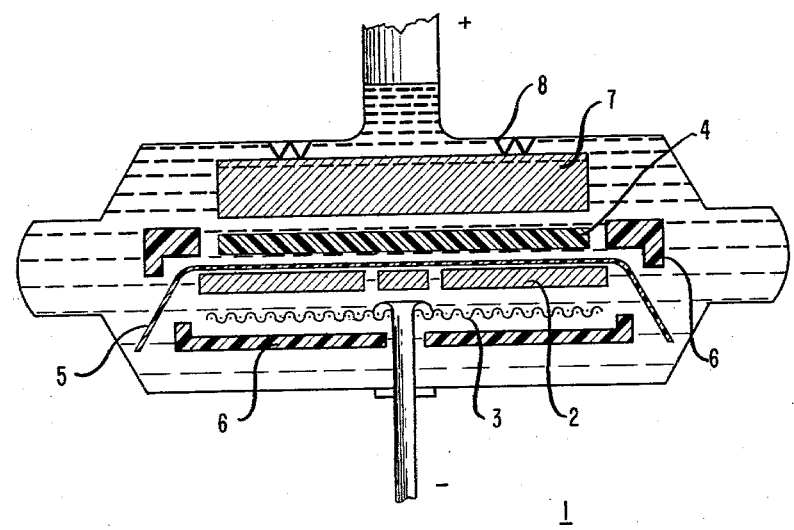

ELECTRODE STRUCTURE FOR ENERGY CELLS

TECHNICAL FIELD

The invention relates to battery and fuel cells and particularly to binders for the electrodes of battery and fuel cells.

BACKGROUND OF THE INVENTION

In recent years, activity directed towards the development and improvement of energy sources and energy storage devices has been rapidly expanding. For example, a considerable amount of work has been directed toward the development of new active electrode materials for battery cells and fuel cells. The use of certain transition-metal chalcogenides as the active material in the positive electrode of secondary cells has yielded a high capacity per unit weight and a favorable discharge characteristic. However, it is now desirable to see if further improvements in cell characteristics and fabrication techniques may be obtained by investigating other aspects of the cell including electrode binders. Binders are electrochemically inactive materials commonly added to the active electrode material to increase the structural integrity and porosity of the electrode.

Maintenance of structural integrity is of considerable importance in the operation of an energy cell. It contributes to stability of operation (retards decrease in voltage and capacity with age) and insures greater lifetime of the battery. It is particularly desirable for secondary batteries which may be repeatedly cycled during operation.

The material used as a binder in the electrode should possess several properties. For example, it is desirable that it be chemically inert with respect to the materials present within the battery cell or fuel cell. The binder should not be susceptible to reduction or oxidation. To maximize energy capacity per unit weight or volume, it is also desirable to obtain good structural integrity with minimum amount of binder material. Additionally, it is advantageous to use a binder material that is light in weight and that forms an intimate and cohesive mixture with the active electrode material. It is also desirable that the electrode structure yield a large surface area per unit weight of active material so as to enhance cell reactions.

In terms of manufacturing electrodes for energy cells, it is desirable to avoid use of solvents and to avoid use of high temperatures and pressures. Solvents are often difficult to dispose of and invariably add to the cost of manufacture. They also add to environmental problems. Avoidance of high temperatures and pressures is desirable so as to insure that the active material is not adversely affected.

At the present time, there are a number of materials used as binders in the electrodes of cells and fuel cells. The most commonly used appear to be polyethylene and polytetrafluoroethelyne. Polytetrafluoroethelyne is frequently referred to as either PTFE or TEFLON. Other fluorocarbon materials have also been used as binders in electrodes. For example, U.S. Pat. No. 4,118,334 discloses a method for forming a cathode structure using a fluorocarbon polymer binder. The method described involves the use of a 50 percent isopropanol solution in water and requires that the electrode mixture be cured at high temperature for long periods of time. While perfectly adequate for some purposes, it is desirable in some cases to be able to form the electrode structure at moderate temperatures and without the use of solvents.

SUMMARY OF THE INVENTION

The invention is a battery cell or fuel cell in which at least one electrode comprises, in addition to active material, a binder material comprising ethyleneperhaloethylene copolymer. If additional conductivity is desirable, a conductive material such as graphite or nickel powder may be added to the electrode. The binder material is a copolymer comprising 40 to 60 mole percent ethylene and 40 to 60 mole percent halogenated ethylene. The halogenated ethylene comonomer is selected from the group consisting of tetrafluoroethylene, chlorotrifluoroethylene and mixtures thereof. In a preferred embodiment, the copolymer consists of a predominantly 1:1 mole ratio chain of alternating ethylenechlorotrifluoroethylene monomers, commonly referred to as either ECTFE or HALAR. Typical procedure for preparing the electrode is as follows:

The binder material is thoroughly mixed with the active electrode material and optionally conductive material to form a reasonably homogeneous mixture which is pressed into the desired shape. The pellet formed is then sintered into a strong and porous matrix. This structure is particularly applicable to nonaqueous batteries because the high degree of chemical activity severely limits the choice of binder materials. Exceptionally good results are obtained where incorporable transition metal oxides, dichalocogenides and trichalcogenides (e.g., $V_6O_{13}$, $TiS_2$, $NbSe_3$, etc.) are used in the electrodes. Cells using this type of binder may be recycled many times and are highly suitable as secondary sources of power. The electrode structure formed permits adequate use of active material and the energy yields high current densities per unit weight. In addition, fabrication is carried out without use of solvent.

BRIEF DESCRIPTION OF THE DRAWING

The FIGURE shows a side view of a cell employing negative electrode, electrolye and a positive electrode made in accordance with the invention.

DETAILED DESCRIPTION

Preparation of the Binder Material

The invention is an energy cell comprising electrolyte, and electrodes with at least one electrode comprising active material and a binder made of an ethyleneperhaloethylene copolymer. Binder concentration may vary over large limits, but a range from 5 to 25 weight percent yields particularly good results. The electrode may also contain an electrically conductive additive such as carbon or nickel powder. The binder comprises a copolymer made from 40 to 60 percent ethylene monomer and from about 40 to 60 percent halogenated ethylene comonomer. Other substances may be incorporated in the ethylene-perhaloethylene copolymer to improve certain of its properties. For instance, to improve the copolymer's resistance to cracking at high operating temperatures, 0.1 to 10 mole percent of a 3,3,3-trifluoro-2-trifluoromethyl propene may be incorporated in the copolymer. An example of such a composition is described by M. M. Mueller in U.S. Pat. No. 3,847,881 issued Nov. 12, 1974. The halogenated monomer is selected from the group consisting of tetrafluoroethylene, chlorotrifluoroethylene and mixtures of these monomers. Good results were obtained with chlorotrifluoroetheylene. A preferred composition is approximately (within ±10 percent) 1:1 mole ratio of ethylene and chlorotrifluoroethylene. A particularly good composition is at least 90 weight percent of 1:1 mole ratio of ethylene and chlorotrifuloroethylene monomers remainder 3,3,3-trifluoro-2-trifluoro-methylpropene. It is particularly preferred that the copolymer have substantially (at least 90 percent by weight) alternating ethylene and chlorotrifluoroethylene monomer units. Such a polymer has a repeating structural unit as follows:

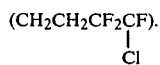

For ethylene-chlorotrifluoroethylene, the number average molecular weight ranges from about 100,000 to about 500,000.

Copolymerization of ethylene and the halogenated monomer is accomplished by various techniques, including by suspension and by emulsion. A variety of initiators may be used, among them peroxides and ionizing radiation. The exemplary preparatory techniques are well known to those skilled in the art. The composition of and properties of some representative perhaloethylene copolymers is described in several references including P. J. Manno, *Nucleonics,* Vol. 22, p. 22 (1964), and "Structure of Copolymers", J. P. Sibilia, L. Roldar, and S. Chandrasekaran, *J. Polymer Sci. Part A*-2 Vol. 10, p. 549 (1972).

Preparation of the Electrode

The electrode of the cell can be made in a number of well-known ways. However, a particularly attractive procedure which will serve for illustrative purposes will be briefly described. If highly reactive electrode materials are present, the preparation is carried in the absence of air and moisture, usually in a dry box under an inert atmosphere. The electrode is formed by mixing the active material, conductive material and copolymer binder material into a homogeneous and well-blended mixture. This mixture is then pressed to form the desired shape. Pressures may vary but 125 to 175 pounds per square inch yields good results without destroying the porosity of the electrodes. Most preferred is 150±10 pounds per square inch. The resulting pellet is then fused in an inert atmosphere (generally nitrogen or argon) at temperatures in the range of the melting temperature of the binder material to form the electrode matrix. Temperatures of about 225–260 degrees C. yield a strong electrode structure. Best results are obtained at 250±5 degrees C. The incorporation of such a copolymer as the binder material permits fabrication of the electrode without the use of solvents, which is an advantage in many applications. The resulting structure is highly porous and permits increased utilization of the active material. It is also mechanically stable so that the desired structural integrity is obtained.

Structure of the Cell

The cell may be constructed in any number of ways. It is believed that the invention will be better understood by reference to an example illustrating the use of a specific copolymer binder with specific electrode materials. The invention, however, may be used in a variety of electrode materials including oxides, sulfides, selenides and tellurides of titanium, hafnium, niobium, tantalum, zirconium and vanadium. A variety of geometries for the cell may also be used. Conventionally, cell preparation is carried out in a dry box to prevent undesired chemical reactions. The FIGURE shows a diagram of a cell 1 suitable for application of the invention. The cell comprises negative electrode 2, stainless steel screen 3, a separator 4 soaked in nonaqueous electrolyte and a CELGARD separator 5 and polypropylene ring 6. Lithium is the active component in the negative electrode. The lithium is in the form of a thin disc 2 which is attached to the stainless steel screen 3, acting as current collector. The remainder of the cell consists of the positive electrode 7, the electrolyte and the current collectors 8. The positive electrode consists of $V_6O_{13}$, nickel powder and ethylene-chlorotrifluoroethylene copolymer binder material. The preparation of the positive electrode is carried out as described. The electrolyte used in the cell is conventional and a variety of electrolytes which do not react chemically with either the anode or the cathode materials and which are electrically conductive to permit migration of ions may be used. Typical electrolytes include salts like $LiAsF_6$, $LiPF_6$, $LiClO_4$, etc. dissolved in a suitable solvent such as propylene carbonate, ethylene carbonate, etc. The cell is then sealed to exclude air and electrical contacts are provided.

What is claimed is:

1. An energy cell comprising electrolyte, electrolyte solvent and electrodes, at least one of said electrodes comprising active material and binder; characterized in that said binder comprises copolymer with from about 40 to 60 mole percent of ethylene comonomer and from about 40 to 60 mole percent of halogenated ethylene comonomer in which the halogenated ethylene comonomer is comprised of at least one substance selected from the group consisting of tetrafluoroethylene and chlorotrifluoroethylene.

2. The cell of claim 1 in which said binder comprises between 5 to 25 percent by weight of said electrode.

3. The cell of claim 2 in which the number average molecular weight of the copolymer binder is comprised between 100,000 and 500,000.

4. The cell of claim 3 in which the copolymer consists essentially of at least 90 weight percent of 1:1 mole ratio chain of ethylene-chlorotrifluoroethylene monomers remainder 3,3,3 trifluoro-2-trifluoromethylpropene.

5. The cell of claim 4 in which the copolymer is comprised of substantially alternating ethylene-chlorotrifuloroethylene monomers.

6. The cell of claim 1 in which the active material in the negative electrode comprises an alkali metal.

7. The cell of claim 6 in which the active material comprises lithium.

8. The cell of claim 1 or 6 in which the active material in the positive electrode is an incorporable compound.

9. The cell of claim 8 in which the active material is selected from the group consisting of oxides, sulfides, selenides and tellurides of titanium, hafnium, niobium, tantalum, zirconium and vanadium.

10. The cell of claim 1 in which the said electrolyte solvent comprises propylene carbonate.

* * * * *